(12) United States Patent
Haraguchi et al.

(10) Patent No.: US 11,069,916 B2
(45) Date of Patent: Jul. 20, 2021

(54) CYLINDRICAL BATTERY

(71) Applicant: SANYO Electric Co., Ltd., Daito (JP)

(72) Inventors: Shin Haraguchi, Hyogo (JP); Kyosuke Miyata, Osaka (JP); Tomohiko Yokoyama, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 42 days.

(21) Appl. No.: 16/086,498

(22) PCT Filed: Mar. 14, 2017

(86) PCT No.: PCT/JP2017/010122
§ 371 (c)(1),
(2) Date: Sep. 19, 2018

(87) PCT Pub. No.: WO2017/164000
PCT Pub. Date: Sep. 28, 2017

(65) Prior Publication Data
US 2019/0103625 A1 Apr. 4, 2019

(30) Foreign Application Priority Data
Mar. 25, 2016 (JP) .............................. JP2016-061018

(51) Int. Cl.
*H01M 10/04* (2006.01)
*H01M 10/0525* (2010.01)
(Continued)

(52) U.S. Cl.
CPC ... *H01M 10/0422* (2013.01); *H01M 10/0525* (2013.01); *H01M 10/0587* (2013.01);
(Continued)

(58) Field of Classification Search
CPC .. H01M 2/022; H01M 2/0277; H01M 2/0413; H01M 2/08; H01M 2/1241;
(Continued)

(56) References Cited

U.S. PATENT DOCUMENTS

| 4,943,497 A | 7/1990 | Oishi et al. |
| 6,692,863 B1 * | 2/2004 | Nakanishi ............. H01M 2/263 |
| | | 429/133 |

(Continued)

FOREIGN PATENT DOCUMENTS

| CN | 101123317 A | 2/2008 |
| CN | 101626093 A | 1/2010 |

(Continued)

OTHER PUBLICATIONS

International Search Report dated Apr. 11, 2017, issued in counterpart International Application No. PCT/JP2017/010122 (2 pages).

(Continued)

*Primary Examiner* — Ula C Ruddock
*Assistant Examiner* — Frank A Chernow
(74) *Attorney, Agent, or Firm* — Westerman, Hattori, Daniels & Adrian, LLP

(57) ABSTRACT

A cylindrical battery according to an embodiment of the present invention includes an electrode body, an electrolyte solution, a tubular exterior can that has a bottom and that accommodates the electrode body and the electrolyte solution, and a sealing body that seals the exterior can. The sealing body includes a valve member, an insulating plate that includes a hollow portion, and a metal plate that has a first through-hole. The insulating plate is disposed between the valve member and the metal plate. At least one of the valve member and the metal plate includes a projection that projects toward an inside of the hollow portion. The valve member and the metal plate are joined to each other at the projection. The insulating plate has a second through-hole that is formed around the hollow portion.

5 Claims, 2 Drawing Sheets

(51) Int. Cl.
    *H01M 10/0587* (2010.01)
    *H01M 50/107* (2021.01)
    *H01M 50/116* (2021.01)
    *H01M 50/166* (2021.01)
    *H01M 50/171* (2021.01)
    *H01M 50/183* (2021.01)
    *H01M 50/578* (2021.01)
    *H01M 50/342* (2021.01)

(52) U.S. Cl.
    CPC ....... *H01M 50/107* (2021.01); *H01M 50/116* (2021.01); *H01M 50/166* (2021.01); *H01M 50/171* (2021.01); *H01M 50/183* (2021.01); *H01M 50/3425* (2021.01); *H01M 50/578* (2021.01)

(58) Field of Classification Search
    CPC ........... H01M 10/0422; H01M 50/107; H01M 50/116; H01M 50/183
    See application file for complete search history.

(56) References Cited

U.S. PATENT DOCUMENTS

| | | |
|---|---|---|
| 2008/0038628 A1 | 2/2008 | Yamauchi et al. |
| 2010/0028762 A1 | 2/2010 | Yokoyama et al. |
| 2011/0123845 A1 | 5/2011 | Kusama et al. |
| 2012/0196163 A1 | 8/2012 | Shimizu et al. |
| 2014/0308550 A1 | 10/2014 | Shimizu et al. |
| 2015/0171409 A1 | 6/2015 | Kiyama et al. |
| 2015/0255766 A1 | 9/2015 | Shimizu et al. |
| 2017/0133645 A1 | 5/2017 | Miyata et al. |

FOREIGN PATENT DOCUMENTS

| | | |
|---|---|---|
| CN | 103296227 A | 9/2013 |
| CN | 104335388 A | 2/2015 |
| CN | 104662704 A | 5/2015 |
| EP | 573998 B2 | 12/1999 |
| JP | 2-288063 A | 11/1990 |
| JP | 6-196140 A | 7/1994 |
| JP | 8-306351 A | 11/1996 |
| JP | H09-134715 A | 5/1997 |
| JP | 2000-260409 A | 9/2000 |
| JP | 2009-110808 A | 5/2009 |
| WO | 2010/137101 A1 | 12/2010 |
| WO | 2011/145263 A1 | 11/2011 |
| WO | 2013/069308 A1 | 5/2013 |
| WO | 2015/146078 A1 | 10/2015 |

OTHER PUBLICATIONS

English Translation of Office Action dated Dec. 3, 2020, issued in counterpart to CN Application No. 201780018184.6. (4 pages).
English Translation of Office Action dated Apr. 23, 2021, issued in counterpart for CN Application No. 201780018184.6. (4 pages).

* cited by examiner

CYLINDRICAL BATTERY

TECHNICAL FIELD

The present invention relates to a cylindrical battery that includes an explosion-proof mechanism.

BACKGROUND ART

Sealed batteries are broadly classified into cylindrical batteries, prismatic batteries, and pouch batteries by the shape and material of exterior bodies that accommodate electrode bodies, which are power generation components. Among these batteries, the cylindrical batteries are widely used as power sources for driving, for example, electric tools, electrically assisted bicycles, and electric vehicles. The cylindrical batteries for these applications are used as assembled batteries that are connected in series or in parallel.

In a sealing body of a cylindrical battery, a measure to ensure safety is taken. In a sealing body of each of cylindrical batteries disclosed in PTL 1 and PTL 2, an explosion-proof mechanism such as a current interrupt mechanism or a gas-discharging mechanism that operates when the pressure in the battery increases and reaches a certain value is incorporated.

FIG. 6 is a sectional view of the sealing body disclosed in PTL 1. The current interrupt mechanism that is incorporated in the sealing body is formed by stacking an outer aluminum foil 61, an inner aluminum foil 62, and an annular insulating plate 63 that is interposed therebetween. The outer aluminum foil 61 and the inner aluminum foil 62 are joined to each other in a hollow portion of the insulating plate 63. When the pressure in the battery increases, the pressure is applied to the outer aluminum foil 61. The inner aluminum foil 62 includes an annular thin portion 62a that is formed around a weld between the inner aluminum foil 62 and the outer aluminum foil 61. When the pressure in the battery reaches a certain value, the thin portion 62a breaks, and a current path between the outer aluminum foil 61 and the inner aluminum foil 62 is interrupted. When the pressure in the battery further increases, the outer aluminum foil 61 breaks, and gas in the battery is discharged. The outer aluminum foil 61 functions as a safety valve.

CITATION LIST

Patent Literature

PTL 1: Japanese Published Unexamined Patent Application No. 8-306351
PTL 2: Japanese Published Unexamined Patent Application No. 2009-110808

SUMMARY OF INVENTION

Technical Problem

As the energy density of a cylindrical battery increases, the amount of gas that is produced in the battery increases by misuse or excessive charge. For this reason, there is a need to improve the function of the explosion-proof mechanism such as the current interrupt mechanism or the gas-discharging mechanism that is incorporated in the sealing body with an increase in the energy density of the cylindrical battery. The sealing body is unconducive to charge and discharge, and it is preferable that a measure to improve the function of a safety mechanism does not affect the thickness of the sealing body.

The present invention has been accomplished in view of the above description, and it is an object of the present invention to provide a cylindrical battery that includes a superior current interrupt mechanism and gas-discharging mechanism by improving the shape of an insulating plate that is included in the current interrupt mechanism.

Solution to Problem

To solve the above problem, a cylindrical battery according to an embodiment of the present invention includes an electrode body, an electrolyte solution, a tubular exterior can that has a bottom and that accommodates the electrode body and the electrolyte solution, and a sealing body that seals the exterior can. The sealing body includes a valve member, an insulating plate that includes a hollow portion, and a metal plate that has a first through-hole. The insulating plate is disposed between the valve member and the metal plate. At least one of the valve member and the metal plate includes a projection that projects toward an inside of the hollow portion. The valve member and the metal plate are joined to each other at the projection. The insulating plate has a second through-hole that is formed around the hollow portion.

Advantageous Effects of Invention

According to an embodiment of the present invention, a cylindrical battery that includes a superior current interrupt mechanism and gas-discharging mechanism can be provided.

DESCRIPTION OF EMBODIMENTS

A non-aqueous electrolyte secondary battery is taken as an example to describe a cylindrical battery according to an embodiment for carrying out the present invention. The present invention is not limited to the embodiment described below, and can be appropriately changed without departing from the spirit of the present invention and carried out.

Figure 1:
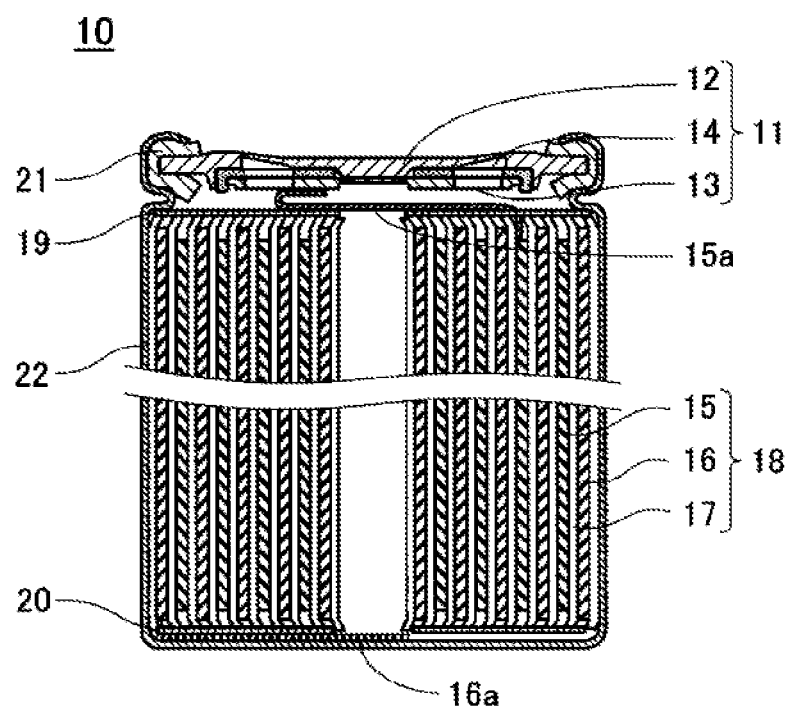
FIG. 1 is a sectional view of a non-aqueous electrolyte secondary battery according to an embodiment.

FIG. 1 is a sectional view of a non-aqueous electrolyte secondary battery 10. An electrode body 18 is accommodated in a tubular exterior can 22 having a bottom. The electrode body 18 is manufactured in a manner in which a positive-electrode plate 15 and a negative-electrode plate 16 are wound with a separator 17 interposed therebetween. A positive-electrode lead 15a and a negative-electrode lead 16a are connected to the positive-electrode plate 15 and the negative-electrode plate 16, respectively. The positive-electrode lead 15a is connected to a sealing body 11. The negative-electrode lead 16a is connected to the bottom of the exterior can 22. The sealing body 11 is crimped on an opening portion of the exterior can 22 with a gasket 21 interposed therebetween. The exterior can 22 accommodates the electrode body 18 and a non-aqueous electrolyte solution not illustrated.

Figure 2:
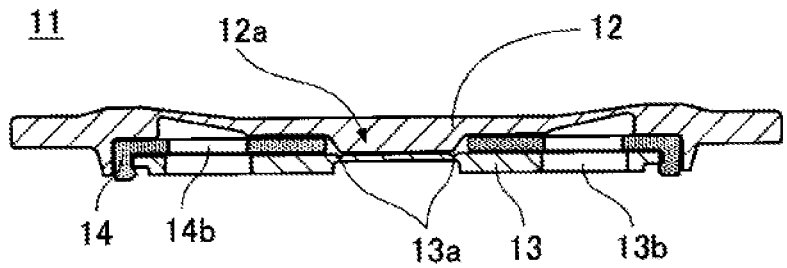
FIG. 2 is a sectional view of a sealing body according to the embodiment.

As illustrated in FIG. 2, the sealing body 11 includes a valve member 12, a metal plate 13, and an insulating plate 14 that is interposed therebetween. The valve member 12 includes a projection 12a that projects toward the inside of a hollow portion 14a of the insulating plate 14. The valve member 12 and the metal plate 13 are joined to each other at the projection 12a. The metal plate 13 may include a projection that projects toward the inside of the hollow portion 14a. The valve member 12 and the metal plate 13 may include respective projections. The positive-electrode lead 15a is connected to the metal plate 13. The metal plate 13 functions as an internal terminal plate. The metal plate 13 is not necessarily connected directly to the positive-electrode lead 15a. Another conductive member that serves as the internal terminal plate can be interposed between the metal plate 13 and the positive-electrode lead 15a. A part of the valve member 12 is exposed to the outside of the battery, and the exposed part can be connected to, for example, external equipment. That is, according to the present embodiment, the valve member 12 functions as a positive-electrode external terminal.

The sealing body 11 includes a current interrupt mechanism that is formed of the valve member 12, the metal plate 13, and the insulating plate 14. The current interrupt mechanism operates as follows. When gas is produced in the battery, and the pressure in the battery increases, the pressure is applied to the valve member 12. When the pressure in the battery reaches a certain value, a thin portion 13a that the metal plate 13 includes breaks, and a current path between the valve member 12 and the metal plate 13 is interrupted. When the pressure in the battery further increases, the valve member 12 breaks, and the gas in the battery is discharged. The gas-discharging mechanism of the sealing body 11 operates in this way.

The sealing body 11 according to the present embodiment consists of the bare minimum of elements to form the current interrupt mechanism. Accordingly, the thickness of the sealing body decreases, and the energy density of the non-aqueous electrolyte secondary battery can be increased. The sealing body 11 can include an additional element such as a terminal cap or a PTC (Positive Temperature Coefficient) element in accordance with the application of the non-aqueous electrolyte secondary battery. For example, the terminal cap can be disposed on the valve member to increase the mechanical strength of the sealing body. However, as in the present embodiment, the valve member is preferably exposed to the outside of the battery to sufficiently ensure a gas discharge path when the gas-discharging mechanism operates.

The materials of the valve member 12 and the metal plate 13 are preferably metallic materials that are highly flexible and can be stable even when a positive electrode potential is applied thereto in the non-aqueous electrolyte solution. Examples of the metallic materials include aluminum and an aluminum alloy. The valve member 12 and the metal plate 13 can be joined to each other by being irradiated with high energy rays such as laser rays.

Figure 3:
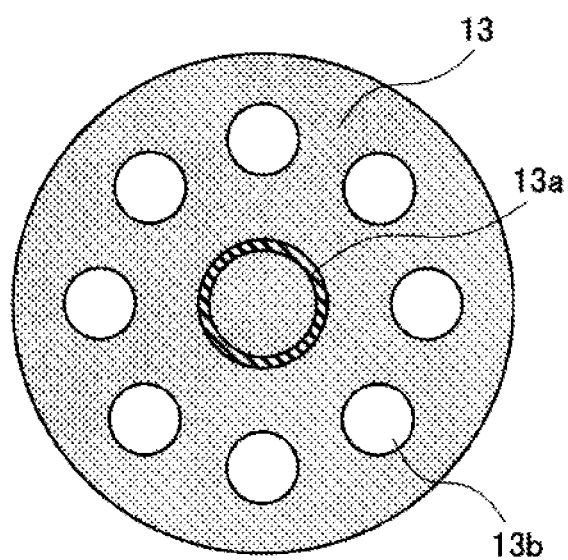
FIG. 3 is a plan view of a metal plate according to the embodiment.

As illustrated in FIG. 3, the metal plate 13 includes the thin portion 13a that is circular and that serves as an easily broken member. The thin portion 13a is formed in a central portion of the metal plate 13. The thin portion 13a is concentric with an outermost circumferential portion of the metal plate. The thin portion may have a C-shape on a circle that is concentric with the outermost circumferential portion of the metal plate. A section of the thin portion has a V-shape but is not limited thereto. The section can have, for example, a U-shape. Eight first through-holes 13b are formed outside the thin portion 13a. The joint between the valve member 12 and the metal plate 13 is formed inside the thin portion 13a. In the case where the joint between the valve member 12 and the metal plate 13 is configured to break when the pressure in the battery reaches a certain value, it is not necessary for the metal plate 13 to include the thin portion 13a.

Each of the first through-holes 13b functions as a path through which the gas that is produced in the battery flows. The number and shape of the first through-holes 13b are not particularly limited. However, the through-holes are preferably formed so as to be symmetric with respect to the center point of the metal plate 13, and the shape thereof is preferably circular. The total area of the first through-holes 13b is preferably no less than 5% and no more than 40% of the area of a region that is surrounded by the outermost circumferential portion of the metal plate 13, more preferably no less than 15% and no more than 30% thereof. The outermost circumferential portion of the metal plate 13 means the outermost circumferential portion of the metal plate 13 viewed from a direction perpendicular to the metal plate 13. The direction perpendicular to the metal plate 13 coincides with the direction in which the valve member 12, the metal plate 13, and the insulating plate 14 are stacked.

Figure 4:
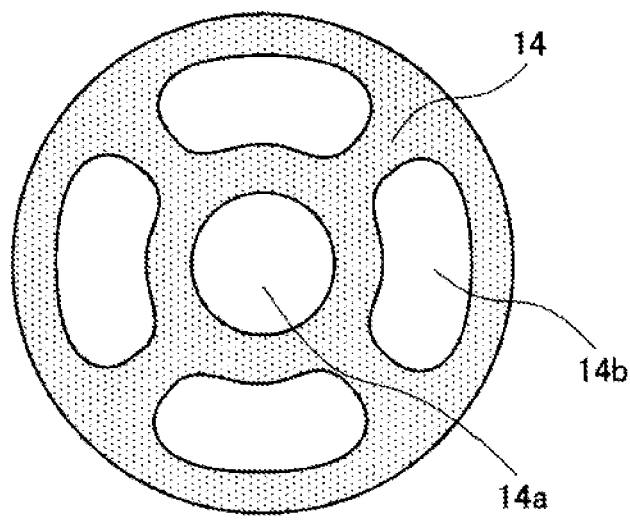
FIG. 4 is a plan view of an insulating plate according to the embodiment.

As illustrated in FIG. 4, the insulating plate 14 has the hollow portion 14a in a central portion and four second through-holes 14b that are formed therearound. The area of the hollow portion 14a is preferably no less than 2% and no more than 20% of the area of a region that is surrounded by an outermost circumferential portion of the insulating plate 14. The outermost circumferential portion of the insulating plate 14 means the outermost circumferential portion of the insulating plate 14 viewed from a direction perpendicular to the metal plate 13. The number and shape of the second through-holes 14b are not particularly limited. However, the second through-holes 14b are preferably formed such that at least a part of each second through-hole 14b overlaps the corresponding first through-holes 13b when viewed from the direction perpendicular to the metal plate 13. A ratio (S2/S1) of the total area S2 of overlapping portions between the first through-holes 13b and the second through-holes 14b to the total area S1 of the first through-holes 13b is preferably no less than 0.5 and no more than 1.

The material that can be used for the insulating plate 14 is preferably a polymeric resin material, examples of which include a polypropylene (PP) resin and a polybutylene terephthalate (PBT) resin.

EXAMPLES

The non-aqueous electrolyte secondary battery 10 according to the present embodiment will now be described in more detail with reference to examples.

First Example (Manufacture of Sealing Body)

Figure 5:
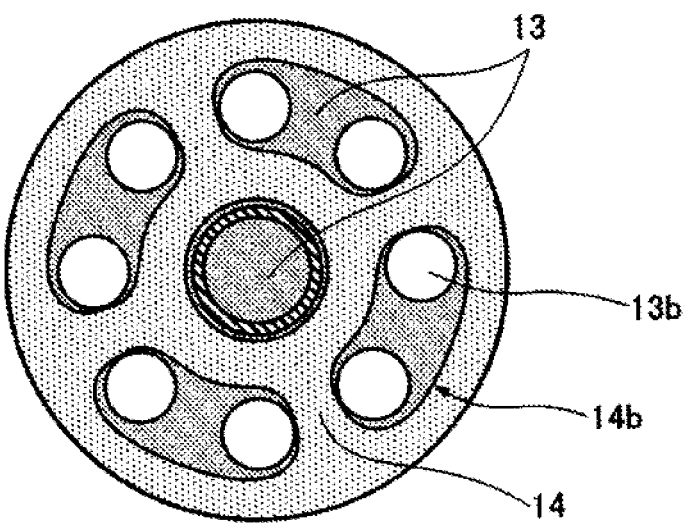
FIG. 5 illustrates the position of the insulating plate with respect to the metal plate in a first example with a plan view.
Figure 6:
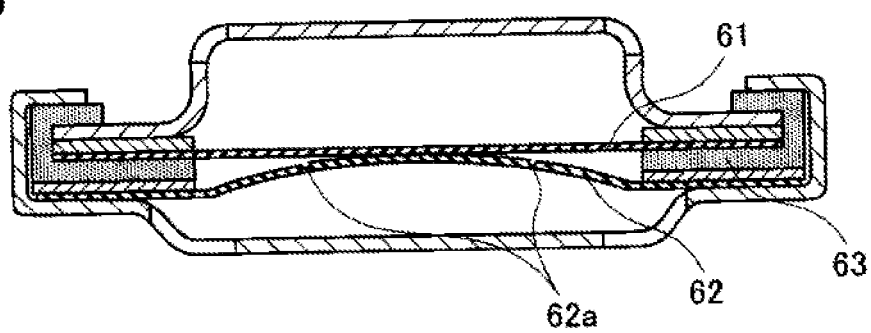
FIG. 6 is a sectional view of a sealing body disclosed in PTL 1.

The valve member 12 and the metal plate 13 serving as the internal terminal plate were manufactured by pressing an aluminum plate. The circular thin portion 13a was formed in the central portion of the metal plate 13. The total area of the first through-holes 13b of the metal plate 13 was 30 mm². The insulating plate 14 was manufactured by injection-molding a polypropylene resin. The diameter of the hollow portion 14a of the insulating plate 14 was 2.8 mm. As illustrated in FIG. 5, the insulating plate 14 was disposed on the metal plate 13 such that all of the first through-holes 13b overlap the second through-holes 14b. The valve member 12 was disposed on the insulating plate 14. The valve member 12 and the metal plate 13 were joined to each other by laser welding at the projection 12a that the valve member 12 included to manufacture the sealing body 11.

In the case where the insulating plate 14 is disposed on the metal plate 13 in the above manner, the total area S2 of the overlapping portions between the first through-holes 13b and the second through-holes 14b is equal to the total area S1 of the first through-holes 13b. That is, the ratio (S2/S1) of the total area S2 of the overlapping portions to the total area S1 of the first through-holes 13b is 1.

(Manufacture of Positive-Electrode Plate)

A lithium nickel composite oxide expressed as $LiNi_{0.91}Co_{0.06}Al_{0.03}O_2$ was used as a positive electrode active material. The positive electrode active material in an amount of 100 parts by mass, acetylene black (AB) as a conductive material in an amount of 1 part by mass, polyvinylidene fluoride (PVdF) as a binder in an amount of 1 part by mass were mixed, and the mixture was kneaded in N-methyl-2-pyrrolidone to prepare a positive-electrode mixture slurry. The positive-electrode mixture slurry was applied to both surfaces of a positive-electrode current collector that is composed of an aluminum foil having a thickness of 13 μm and dried to form a positive-electrode mixture layer. The positive-electrode mixture layer was pressed by a roller such that a filling density became 3.6 g/cm³. An electrode plate after pressing was cut with predetermined dimensions to manufacture the positive-electrode plate 15. An exposed positive-electrode core portion was formed such that there was no positive-electrode mixture layer on a part of the positive-electrode plate 15. The positive-electrode lead 15a that was composed of aluminum was connected to the exposed positive-electrode core portion.

(Manufacture of Negative-Electrode Plate)

A mixture of graphite in an amount of 93 parts by mass and silicon oxide (SiO) in an amount of 7 parts by mass was used as a negative electrode active material. The negative electrode active material in an amount of 100 parts by mass, carboxymethyl cellulose (CMC) as a thickener in an amount of 1 part by mass, and styrene-butadiene rubber (SBR) as a binder in an amount of 1 part by mass were mixed, and the mixture was kneaded in water to prepare a negative-electrode mixture slurry. The negative-electrode mixture slurry was applied to both surfaces of a negative-electrode current collector that was composed of a copper foil having a thickness of 6 μm and dried to form a negative-electrode mixture layer. The negative-electrode mixture layer was pressed by a roller such that the filling density became 1.65 g/cm³. An electrode plate after pressing was cut with predetermined dimensions to manufacture the negative-electrode plate 16. An exposed negative-electrode core portion was formed such that there was no negative-electrode mixture layer on a part of the negative-electrode plate 16. The negative-electrode lead 16a that was composed of copper was connected to the exposed negative-electrode core portion.

(Preparation of Non-Aqueous Electrolyte Solution)

Ethylene carbonate (EC), diethyl carbonate (DMC), ethyl methyl carbonate (MEC) were mixed at a volume ratio of 20:75:5 to prepare a non-aqueous solvent. Lithium hexafluorophosphate ($LiPF_6$) as an electrolyte salt was dissolved at a concentration of 1.4 mol/L in the non-aqueous solvent to prepare a non-aqueous electrolyte solution.

(Manufacture of Electrode Body)

The positive-electrode plate 15 and the negative-electrode plate 16 were wound with the separator 17 interposed therebetween to manufacture the electrode body 18. A polyethylene fine porous film including a heat-resistant layer formed on a surface thereof was used as the separator 17, and in the heat-resistant layer, alumina ($Al_2O_3$) was dispersed in polyamide. The heat-resistant layer was disposed so as to face the positive-electrode plate.

(Manufacture of Non-Aqueous Electrolyte Secondary Battery)

An upper insulating plate 19 and a lower insulating plate 20 were disposed on the upper side and lower side of the electrode body 18. The electrode body 18 was inserted into the tubular exterior can 22 having the bottom. The positive-electrode lead 15a was connected to the sealing body 11. The negative-electrode lead 16a was connected to the bottom of the exterior can 22. The non-aqueous electrolyte solution was injected into the exterior can. The sealing body 11 was crimped on the opening portion of the exterior can 22 with the gasket 21 interposed therebetween to manufacture the non-aqueous electrolyte secondary battery 10 having an outer diameter of 18 mm and a height of 65 mm in a first example.

Second to Fourth Examples

Non-aqueous electrolyte secondary batteries in second to fourth examples were manufactured in the same manner as in the first example except that the total area of the second through-holes of the insulating plate and the position of the insulating plate were changed, and S2/S1 was determined to be values illustrated in Table 1.

Comparative Example

A non-aqueous electrolyte secondary battery in a comparative example was manufactured in the same manner as in the first example except that the insulating plate had no second through-holes.

(Heat Test)

Heat tests were performed on 10 batteries in the first to fourth examples and the comparative example. After the tests, the appearance of each battery was observed to check the presence or absence of damage such as a break of the exterior can. The heat tests were performed in the following procedure. Each battery was charged with a constant-current of 0.3 It (=1050 mA) at 25° C. until the voltage of the battery became 4.2 V. Subsequently, the battery was charged at a constant voltage of 4.2 V until the value of current became 0.02 It (=70 mA). A thermocouple was attached to a side surface of the battery that was charged. The battery was placed in a tubular furnace that was heated to 700° C. The battery was stored in the tubular furnace until thermal runaway of the battery occurred. During the storage, the temperature of the battery was measured with the thermocouple, and the presence or absence of thermal runaway was decided in accordance with a variation in the temperature of the battery. Table 1 illustrates the results of the heat tests in the first to fourth examples and the comparative example.

TABLE 1

| | S2/S1 | INCIDENT OF DAMAGE OF EXTERIOR CAN |
|---|---|---|
| FIRST EXAMPLE | 1 | 0% |
| SECOND EXAMPLE | 0.7 | 0% |
| THIRD EXAMPLE | 0.5 | 0% |
| FOURTH EXAMPLE | 0.3 | 20% |
| COMPARATIVE EXAMPLE | 0 | 40% |

As results of the heat tests, the exterior can damaged in the fourth example and the comparative example. The exterior can damaged to such a degree that the exterior can did not burst but a part of a side surface thereof broke. Even when the thermal runaway of the battery was forcefully caused to occur, there was a low risk that the battery burst because gas that was produced in the battery was discharged from the broken valve member. However, in the case where only the hollow portion formed in the central portion served as an air vent of the insulating plate as in the comparative example, a molten material of, for example, the separator in the battery caused a part of the hollow portion to clog, and the ability to discharge the gas became insufficient. For this reason, the part of the side surface of the exterior can in the comparative example presumably broke.

In the first to fourth examples, the insulating plate included the hollow portion and the second through-holes serving as air vents therearound. For this reason, the incident of the damage of the exterior can decreased. The second through-holes that are formed around the hollow portion of the insulating plate enable the ability of the sealing body as the gas-discharging mechanism to be enhanced. In comparison with the results of the first to fourth examples, it can be understood that the ratio (S2/S1) of the total area S2 of the overlapping portions to the total area S1 of the first through-hole is preferably no less than 0.5 and no more than 1.

In the case where an assembled battery is formed of many batteries, the batteries are arranged such that side surfaces of the batteries are in close contact with each other. Accordingly, when an abnormality occurs at a part of one of the batteries and causes the side surface of the battery to break, there is a risk that the temperature of other batteries adjacent thereto increases, and the batteries are burned. According to the present invention, each battery can be inhibited from breaking at the side surface even when the thermal runaway occurs, and this improves the safety of the assembled battery.

In the case where the second through-holes are formed around the hollow portion of the insulating plate as in the examples, the area of the hollow portion can be decreased. As a result of the area of the hollow portion being decreased, the thin portion serving as the easily broken member that the metal plate includes is adjacent to the insulating plate, and this enables the valve member and the metal plate to be insulated from each other with certainty after the current interrupt mechanism operates.

INDUSTRIAL APPLICABILITY

According to the present invention, a cylindrical battery that includes a superior current interrupt mechanism and gas-discharging mechanism can be provided as described above. The present invention can be widely used for cylindrical batteries, and the industrial applicability thereof is wide.

REFERENCE SIGNS LIST 10 non-aqueous electrolyte secondary battery
11 sealing body
12 valve member
12a projection
13 metal plate
13a thin portion
13b first through-hole
14 insulating plate
14a hollow portion
14b second through-hole
18 electrode body
22 exterior can

The invention claimed is:

1. A cylindrical battery comprising: an electrode body; an electrolyte solution; a tubular exterior can that has a bottom and that accommodates the electrode body and the electrolyte solution; and a sealing body that seals the exterior can,
   wherein the sealing body includes a valve member, an insulating plate that includes a hollow portion, and a metal plate that has a first through-hole,
   wherein the insulating plate is disposed between the valve member and the metal plate,
   wherein at least one of the valve member and the metal plate includes a projection that projects toward an inside of the hollow portion,
   wherein the valve member and the metal plate are joined to each other at the projection,
   wherein the insulating plate has a second through-hole that is formed around the hollow portion,
   wherein the hollow portion is located in the center of the insulating plate, and
   wherein the second through-hole is located between the hollow portion and the outer edge of the insulating plate.

2. The cylindrical battery according to claim 1 further comprising: an overlapping portion at which at least a part of the second through-hole overlaps the first through-hole when viewed from a direction perpendicular to the metal plate.

3. The cylindrical battery according to claim 2, wherein a ratio of a total area of the overlapping portion to a total area of the first through-hole is no less than 0.5 and no more than 1.

4. The cylindrical battery according to claim 1, wherein the valve member is exposed to an outside of the battery.

5. The cylindrical battery according to claim 1, wherein the sealing body includes a terminal cap that is disposed on the valve member.

* * * * *